United States Patent
Park et al.

(10) Patent No.: US 9,588,665 B2
(45) Date of Patent: Mar. 7, 2017

(54) OBJECT EDITING METHOD AND ELECTRONIC DEVICE THEREOF

(71) Applicant: Samsung Electronics Co., Ltd., Gyeonggi-do (KR)

(72) Inventors: Jun-Young Park, Gyeonggi-do (KR); Geon-Soo Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 259 days.

(21) Appl. No.: 14/295,036

(22) Filed: Jun. 3, 2014

(65) Prior Publication Data

US 2014/0365958 A1    Dec. 11, 2014

(30) Foreign Application Priority Data

Jun. 10, 2013 (KR) .................... 10-2013-0066034

(51) Int. Cl.
G06F 3/048       (2013.01)
G06F 3/0484      (2013.01)
G06F 3/0488      (2013.01)

(52) U.S. Cl.
CPC ........ G06F 3/04845 (2013.01); G06F 3/0488 (2013.01); *G06F 2203/04805* (2013.01)

(58) Field of Classification Search
CPC .................................................. G06F 3/04845
USPC ........................................................ 715/790
See application file for complete search history.

(56) References Cited

U.S. PATENT DOCUMENTS

| | | | | |
|---|---|---|---|---|
| 5,617,114 A * | 4/1997 | Bier | ...................... | G06F 3/0481 345/634 |
| 5,892,511 A * | 4/1999 | Gelsinger | ............. | G06F 3/0481 715/790 |
| 6,337,703 B1 * | 1/2002 | Konar | ................. | G06F 3/04812 345/157 |
| 6,469,717 B1 * | 10/2002 | Wineke | ............... | G06F 3/04845 715/765 |
| 7,810,039 B2 * | 10/2010 | Yamamoto | .......... | G06F 3/04845 715/243 |
| 7,831,901 B1 * | 11/2010 | Balev | ................. | G06F 3/04845 715/209 |
| 8,497,884 B2 * | 7/2013 | Cholewin | ............. | G06F 1/1626 345/678 |
| 8,930,846 B2 * | 1/2015 | Sirpal | ................... | G06F 1/1616 715/761 |
| 9,092,128 B2 * | 7/2015 | Toprani | ................. | G06F 3/0488 |
| 9,146,655 B2 * | 9/2015 | Han | ...................... | G06F 3/0481 |
| 9,213,460 B2 * | 12/2015 | Nurse | ..................... | G06F 3/048 |
| 9,218,113 B2 * | 12/2015 | Kudo | .................. | G06F 3/04845 |
| 9,377,937 B2 * | 6/2016 | Han | ..................... | G06F 3/04842 |
| 2003/0179234 A1 * | 9/2003 | Nelson | ................. | G06T 11/206 715/764 |

(Continued)

FOREIGN PATENT DOCUMENTS

KR    20100041107    4/2010
KR    20120037858    4/2012

*Primary Examiner* — William Titcomb
(74) *Attorney, Agent, or Firm* — The Farrell Law Firm, P.C.

(57) ABSTRACT

A method and apparatus for editing an object of an electronic device are provided. The object editing method of the electronic device includes determining whether an area for editing an object overlaps the another area for editing the object, and if the area for editing the object overlaps the another area for editing the object, enlarging the area for editing the object.

20 Claims, 18 Drawing Sheets

(56) References Cited

U.S. PATENT DOCUMENTS

| | | | |
|---|---|---|---|
| 2004/0239691 A1* | 12/2004 | Sprang | G06F 3/04845 345/651 |
| 2007/0159497 A1* | 7/2007 | Gur | G06F 3/04845 345/650 |
| 2008/0034317 A1* | 2/2008 | Fard | G06F 3/0481 715/781 |
| 2008/0187248 A1* | 8/2008 | Ikeda | H04N 1/0044 382/305 |
| 2010/0138763 A1* | 6/2010 | Kim | G06F 1/1626 715/765 |
| 2010/0208138 A1* | 8/2010 | Mohri | G06F 1/1622 348/570 |
| 2011/0163971 A1* | 7/2011 | Wagner | G06F 3/04817 345/173 |
| 2013/0080970 A1* | 3/2013 | Sirpal | G06F 3/1438 715/790 |
| 2014/0146039 A1* | 5/2014 | Duplessis | G06T 19/20 345/419 |

* cited by examiner

OBJECT EDITING METHOD AND ELECTRONIC DEVICE THEREOF

PRIORITY

This application claims priority under 35 U.S.C. §119(a) to a Korean Patent Application filed in the Korean Intellectual Property Office on Jun. 10, 2013 and assigned Serial No. 10-2013-0066034, the entire disclosure of which is incorporated herein by reference.

BACKGROUND OF THE DISCLOSURE

1. Field of the Disclosure

The present disclosure relates generally to controlling an electronic device to avoid overlapping of areas for editing an object.

2. Description of the Related Art

When an electronic device provides an object editing function by using an object editing program, a user of the electronic device edits an object by selecting and moving an area for editing an object (or an object editing area) for the object editing. However, if a size of the object is less than a reference size, the user of the electronic device may have difficulty in editing the object due to overlapping areas for editing objects.

Accordingly, the electronic device requires an interface for providing object editing irrespective of the size of the object.

SUMMARY OF THE DISCLOSURE

An aspect of the present disclosure is to solve at least the above-mentioned problems and/or disadvantages and to provide at least the advantages described below.

Accordingly, an aspect of the present disclosure provides an apparatus and method for editing an object in an electronic device.

Another aspect of the present disclosure provides an apparatus and method for determining whether an area for editing an object overlaps another area for editing the object in an electronic device.

Another aspect of the present disclosure provides an apparatus and method for enlarging an area for editing an object when the area for editing the object overlaps another area for editing the object in an electronic device.

Another aspect of the present disclosure provides an apparatus and method for displaying an object specific editing window for editing an object when an area for editing the object overlaps another area for editing the object in an electronic device.

Another aspect of the present disclosure provides an apparatus and method for enlarging an area for editing an object and displaying an object specific editing window when the area for editing the object overlaps another area for editing the object in an electronic device.

In accordance with an aspect of the present disclosure, a method of editing an object of an electronic device is provided. The method includes determining whether an area for editing an object overlaps another area for editing an object, and if the area for editing the object overlaps the another area for editing the object, enlarging the area for editing the object.

In accordance with another aspect of the present disclosure, an electronic device is provided. The electronic device includes at least one memory, and at least one processor configured to determine whether an area for editing the object overlaps another area for editing the object, and if the area for editing the object overlaps the another area, enlarge the area for editing the object.

BRIEF DESCRIPTION OF THE DRAWINGS

The above and other aspects, features and advantages of certain embodiments of the present disclosure will be more apparent from the following detailed description taken in conjunction with the accompanying drawings, in which.

DETAILED DESCRIPTION OF EMBODIMENTS OF THE PRESENT DISCLOSURE

Embodiments of the present disclosure will be described herein below with reference to the accompanying drawings. In the following description, well-known functions or constructions are not described in detail since they would obscure the disclosure in unnecessary detail. Also, the terms used herein are defined according to the functions of the present disclosure. Thus, the terms may vary depending on user's or operator's intention and usage. That is, the terms used herein must be understood based on the descriptions made herein.

In the following description, the electronic device may include a mobile communication terminal, a Personal Digital Assistant (PDA), a laptop computer, a smart phone, a netbook, a television, a Mobile Internet Device (MID), a Ultra Mobile Personal Computer (UMPC), a tablet Personal Computer (PC), a navigator, a digital refrigerator, a digital watch, and an Motion Picture Experts Group Layer 3 (MP3) player, and the like.

In the following description, an object editing area is an area for detecting a selection on an object editing handle for editing an object, and includes an area equal to, narrower than, or wider than a display area of the object editing handle, and also includes an area for moving the object. In addition, the object editing handle may include a handle for changing a size of the object and a handle for rotating the object. In addition, an object specific editing window may include an object position editing icon for changing a position of the object, an object size editing icon for changing a size of the object, and an object direction editing icon for changing a direction of the object.

Figure 1:
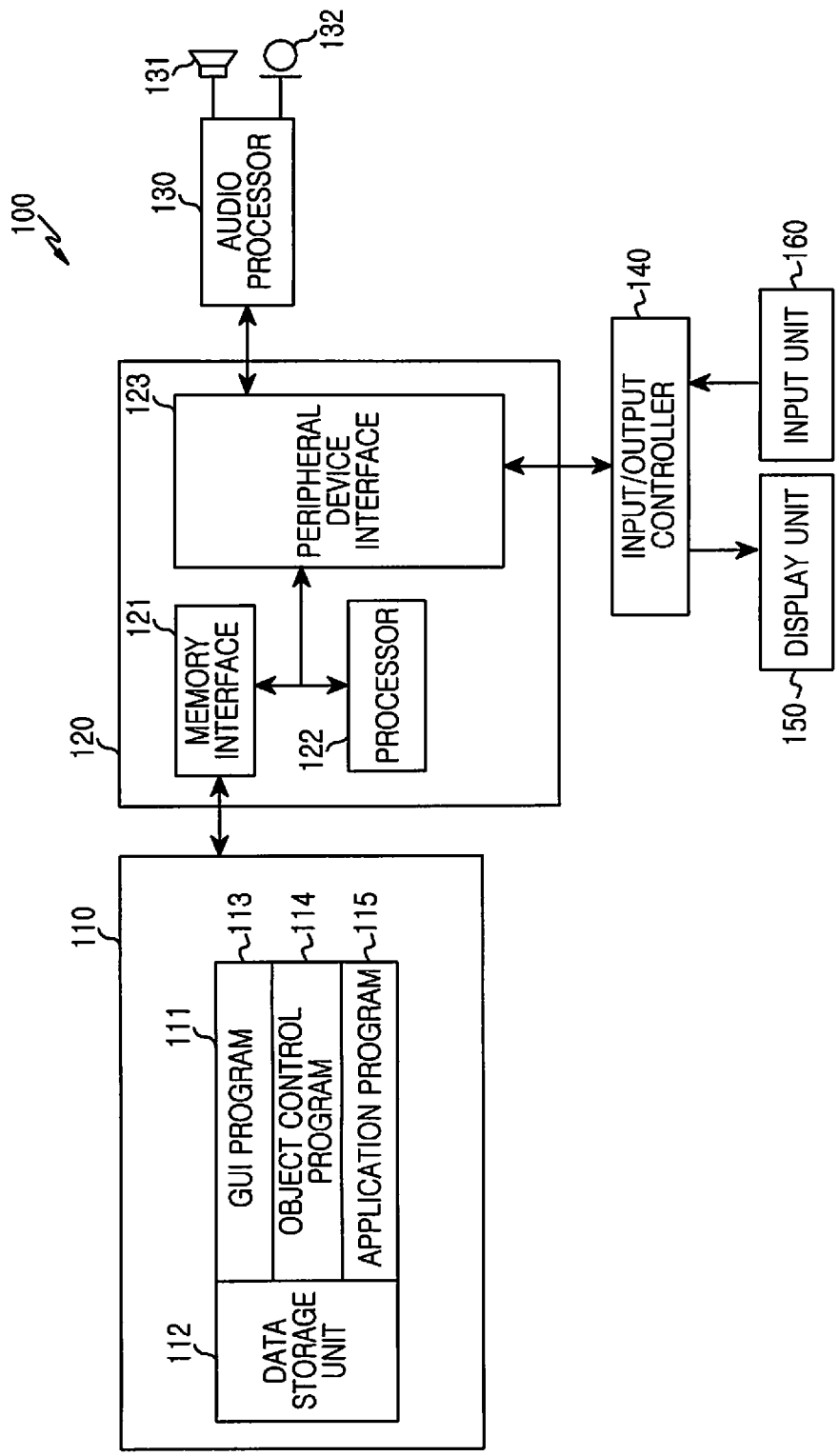
FIG. 1 is a block diagram illustrating a structure of an electronic device according to an embodiment of the present disclosure.

FIG. 1 is a block diagram illustrating a structure of an electronic device according to an embodiment of the present disclosure.

Referring to FIG. 1, an electronic device 100 includes a memory 110, a processor unit 120, an audio processor 130, an input/output controller 140, a display unit 150, and an input unit 160. Herein, the memory 110 may include a plurality of memories.

The memory 110 includes a program storage unit 111 for storing a program for controlling an operation of the electronic device 100 and a data storage unit 112 for storing data generated during execution of the program. The program storage unit 111 may include a Graphic User Interface (GUI) program 113, an object control program 114, and at least one application program 115. Herein, the program included in the program storage unit 111 is a group of instructions, and may be expressed as an instruction set.

The GUI program 113 may include at least one software component for providing a graphic user interface on the display unit 150. For example, the GUI program 113 may include an instruction for displaying information of an application program driven by the processor 122 to the display unit 150. As another example, the GUI program 113 may control the display unit 150 to display at least one object editing handle for editing an object by using the object control program 114. As a further example, the GUI program 113 may control the display unit 150 to display an object specific editing window for editing an object by using the object control program 114.

If the area for editing the object overlaps another area for editing the object, the object control program 114 includes at least one software component for enlarging the area for editing the object. For example, upon detecting a selection on at least one object, the object control program 114 provides control to display at least one object editing handle for editing the object by using the GUI program 113. In this case, upon detecting a movement of the at least one object editing handle, the object control program 114 determines whether the object editing area overlaps another object editing area. If the object editing areas overlap, the object control program 114 may enlarge the selected object editing area to facilitate the editing of the object. For example, if the object editing area is equal to a display area of an object editing handle icon, the object control program 114 determines whether the object editing handle icon overlaps another object editing handle icon. If the object editing handle icons overlap, the object control program 114 provides control through the GUI program 113 to display the selected object editing handle icon by enlarging or moving it so as to avoid overlapping of the object editing handle icons.

In addition, if the area for editing the object overlaps another area for editing the object, the object control program 114 includes at least one software component for providing the object specific editing window for editing the object. For example, upon detecting a selection on at least one object, the object control program 114 provides control to display at least one object editing handle for editing the object through the GUI interface program 113. In this case, upon detecting a movement of the at least one object editing handle, the object control program 114 determines whether the object editing area overlaps another object editing area. If the object editing areas overlap, the object control program 114 provides the object specific editing window to facilitate the editing of the object. For example, the object control program 114 may provide control to display the object specific display window through the GUI program 113.

The application program 115 includes a software component for at least one application installed in the electronic device 100.

The processor unit 120 includes a memory interface 121, at least one processor 122, and a peripheral device interface 123. Herein, the memory interface 121, the at least one processor 122, and the peripheral device interface 123 included in the processor unit 120 may be integrated as at least one integrated circuit or may be implemented as separate components.

The memory interface 121 controls an access to the memory 110 with respect to a component such as the processor 122 or the peripheral device interface 123.

The peripheral device interface 123 controls a connection of an input/output controller 140, the processor 122, and the memory interface 121 of the electronic device 100.

Figure 2:
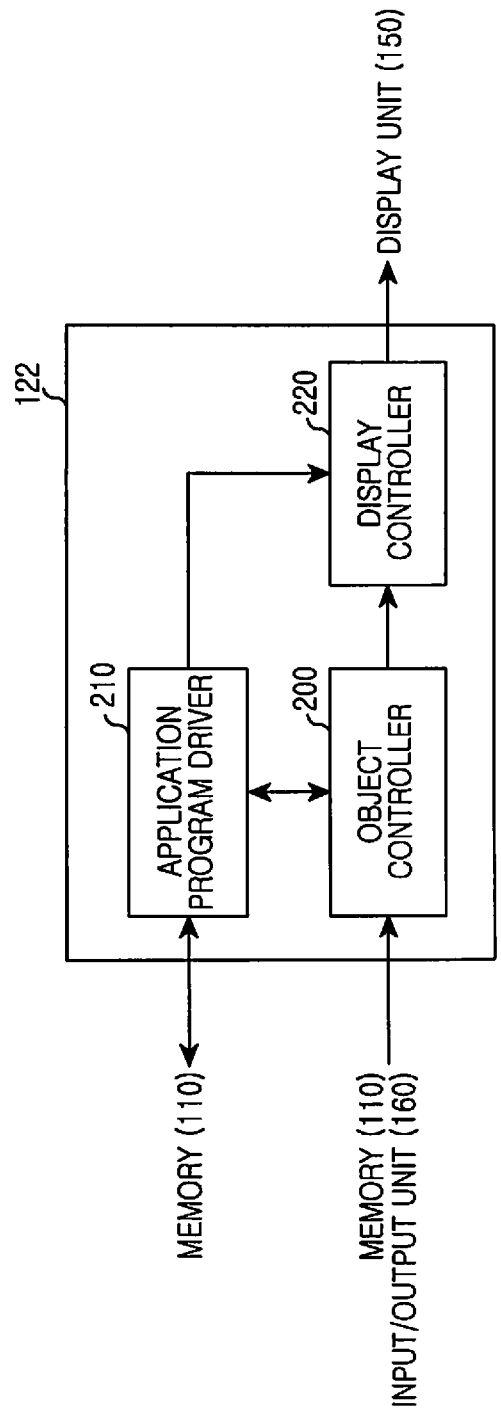
FIG. 2 is a block diagram illustrating a structure of a processor according to various embodiments of the present disclosure.

The processor 122 controls the electronic device 100 to provide various multimedia services by using at least one software program. In this case, the processor 122 executes at least one program stored in the memory 110 to provide a service according to the program. For example, the processor 122 may be configured as illustrated in FIG. 2 to control object editing by executing the object control program 114.

The audio processor 130 provides an audio interface between the user and the electronic device 100 via a speaker 131 and a microphone 132.

The input/output controller 140 provides an interface between the peripheral device interface 123 and an input/output device of the display unit 150 and the input unit 160.

The display unit 150 displays, for example, status information of the electronic device 100, a character input by a user, a moving picture, and a still picture. For example, the display unit 150 displays application program information driven by the processor 122. As another example, the display unit 150 displays at least one object editing handle for editing an object provided from the object control program 114 under the control of the GUI program 113. As another example, the display unit 150 displays the object specific editing window for editing an object provided from the object control program 114 under the control of the GUI program 113.

The input unit 160 provides input data generated by a user's selection to the processor unit 120 via the input/output controller 140. In this case, the input unit 160 may include a keypad including at least one hardware button and a touch screen for sensing touch information. For example, the input unit 160 may provide touch information detected through a touch pad to the processor 122 via the input/output controller 140.

In addition, the electronic device may further include a communication system, and thus may include at least one software component for performing a communication function for voice communication and data communication. In this case, the communication system may be divided into a plurality of communication sub-modules which support different communication networks. For example, the communication network is not limited thereto, and thus may include a Global System for Mobile communications (GSM) network, an Enhanced Data rates for GSM Evolution (EDGE) network, a Code Division Multiple Access (CDMA) network, a Wideband-CDMA (W-CDMA) network, a Long Term Evolution (LTE) network, an Orthogonal Frequency Division Multiple Access (OFDMA) network, a Wireless Local Area Network (WLAN), a Bluetooth network, and Near Field Communication (NFC).

FIG. 2 is a block diagram illustrating a structure of a processor according to various embodiments of the present disclosure.

Referring to FIG. 2, the processor 122 may include an object controller 200, an application program driver 210, and a display controller 220.

The object controller 200 executes the object control program 114 of the program storage unit 111, and if an area for editing an object overlaps another area for editing the object, controls to enlarge the area for editing the object. For example, upon detecting a selection on at least one object, the object controller 200 controls to display at least one object editing handle for editing the object under the control of the display controller 220. In this case, upon detecting a movement of the at least one object editing handle, the object controller 200 determines whether the object edit area overlaps another object edit area. If the object editing areas overlap, the object controller 200 may enlarge the object editing area to facilitate the editing of the object. For example, if the object editing area is equal to a display area of an object editing handle icon, the object controller 200 determines whether the object editing handle icon overlaps another object editing handle icon. If the object editing handle icons overlap, the object controller 200 controls to display the object editing handle icon by enlarging and moving it under the control of the display controller 220 so as to avoid overlapping of the another object editing handle icon.

In addition, the object controller 200 executes the object control program 114 of the program storage unit 111, and if the area for editing the object overlaps another area for editing the object, provides an object specific editing window for editing the object. For example, upon detecting a selection on at least one object, the object controller 200 may control to display at least one object editing handle for editing the object under the control of the display controller 220. In this case, upon detecting a movement of the at least one object editing handle, the object controller 200 determines whether the object edit area overlaps another object edit area. If the object editing areas overlap, the object controller 200 may provide the object specific editing window to facilitate the editing of the object. For example, the object controller 200 may control to display the object specific display window under the control of the display controller 220.

The display controller 220 executes the GUI program 113 of the program storage unit 111 to provide a user interface on the display unit 150 in a graphic manner. For example, the display controller 220 controls the display unit 150 to display information of an application program which is driven by the processor 122. As another example, the display controller 220 controls the display unit 150 to display at least one object editing handle for editing the object by using the object controller 200. As another example, the display controller 220 controls the display unit 150 to display the object specific editing window for editing the object by using the object controller 200.

In the aforementioned embodiment, the object controller 200 of the electronic device executes the object control program 114 to control the editing of the object. In another embodiment, the electronic device may include a separate object control module including the object control program 114.

Figure 3:
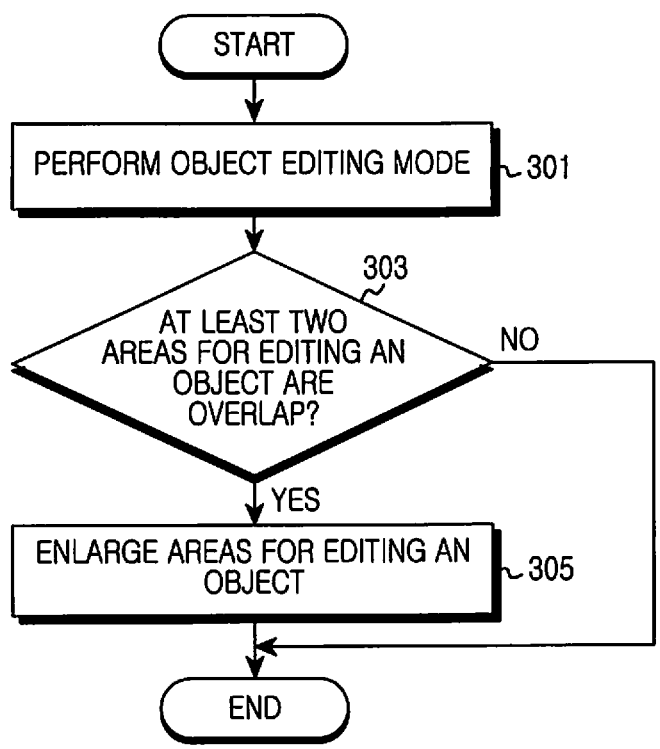
FIG. 3 is a flowchart of a control process for avoiding overlapping of areas for editing an object, when an area for editing the object overlaps another area for editing the object, while editing the object in an electronic device according to an embodiment of the present disclosure.

FIG. 3 is a flowchart of a control process for avoiding overlapping of object editing areas, when an object editing area overlaps another object editing area while editing an object in an electronic device according to an embodiment of the present disclosure.

Figure 9A:
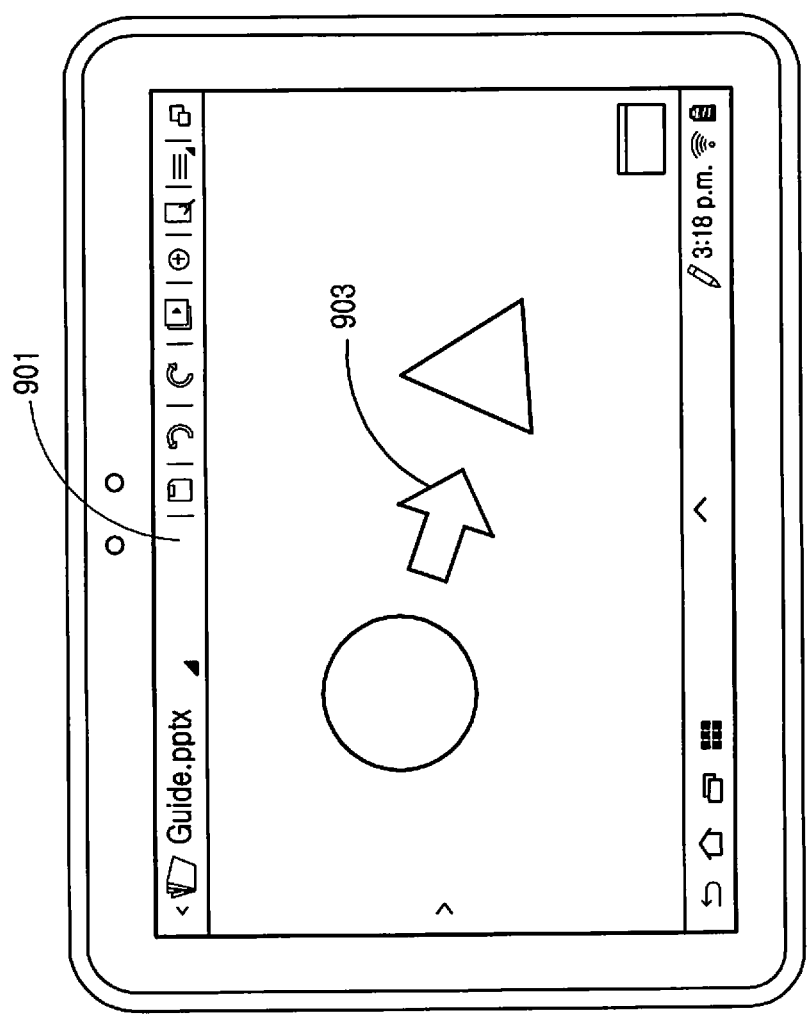
FIG. 9A to FIG. 9J illustrate screen configurations for editing an object in an electronic device according to various embodiments of the present disclosure.
Figure 9B:
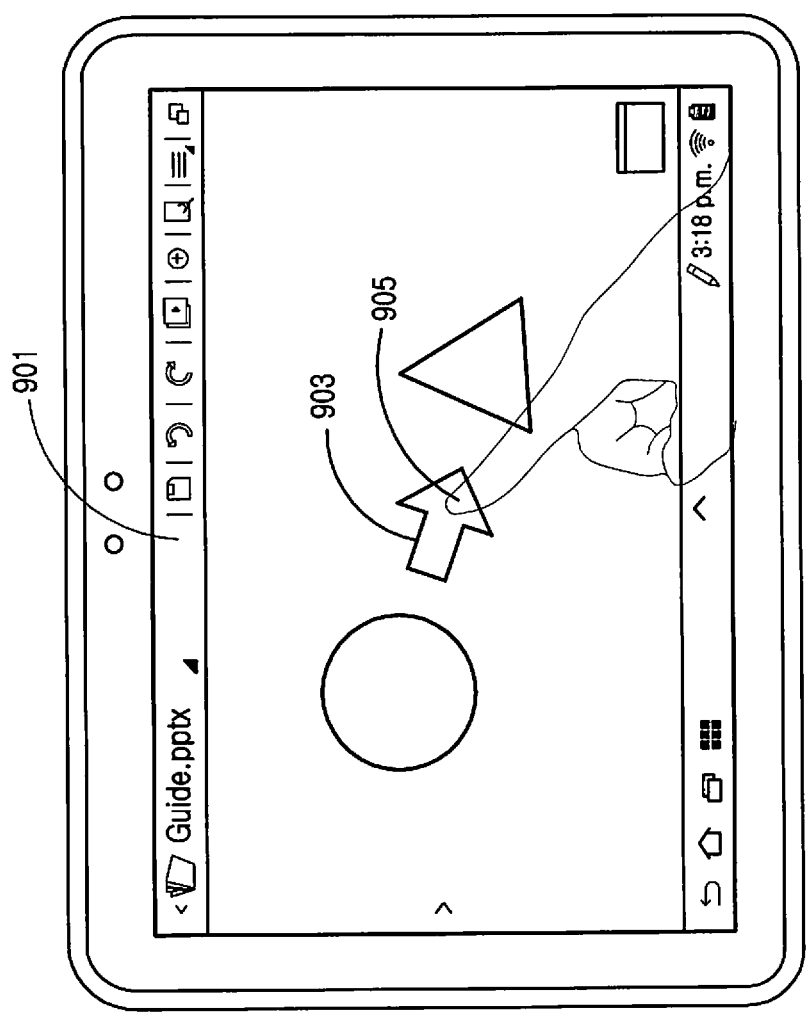
Figure 9C:
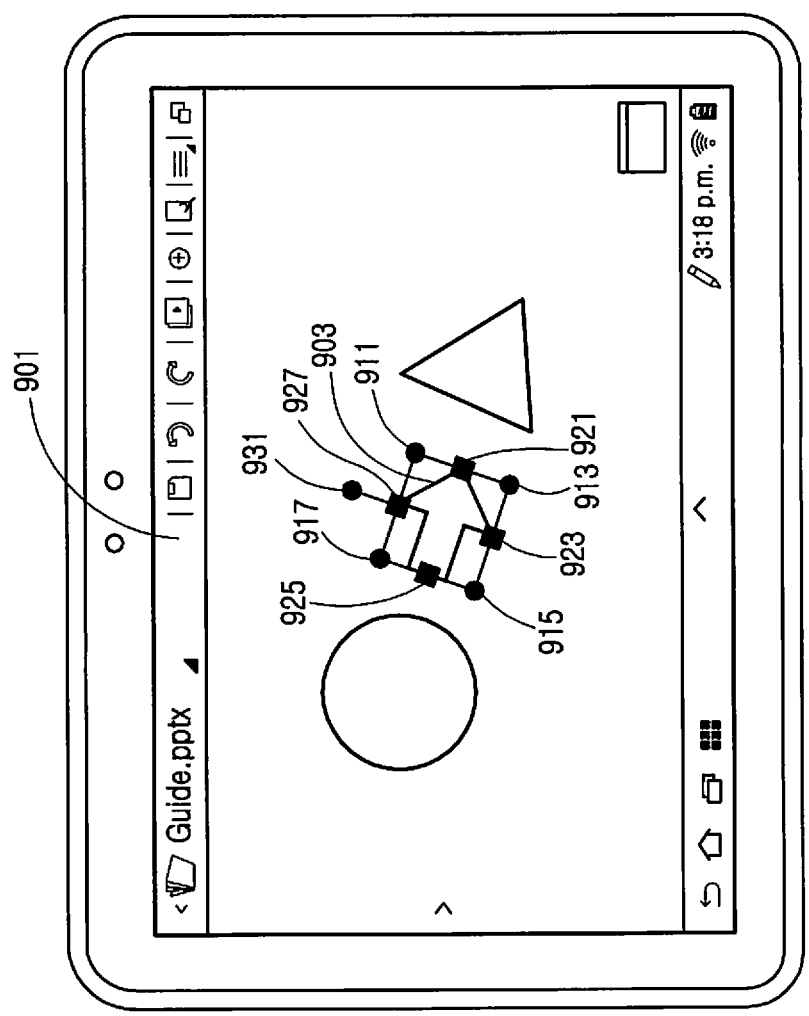

Referring to FIG. 3, the electronic device performs an object editing mode in step 301. For example, as illustrated in FIG. 9B, upon detecting a selection 905 on an object 903 displayed by using an object editing program 901, the electronic device recognizes that the object 903 is being edited. Accordingly, the electronic device displays at least one object editing handle for editing the object 903 as illustrated in FIG. 9C. Herein, the object editing handle includes handles 911 to 927 for changing a size of the object and a handle 931 for rotating the object.

Figure 9D:
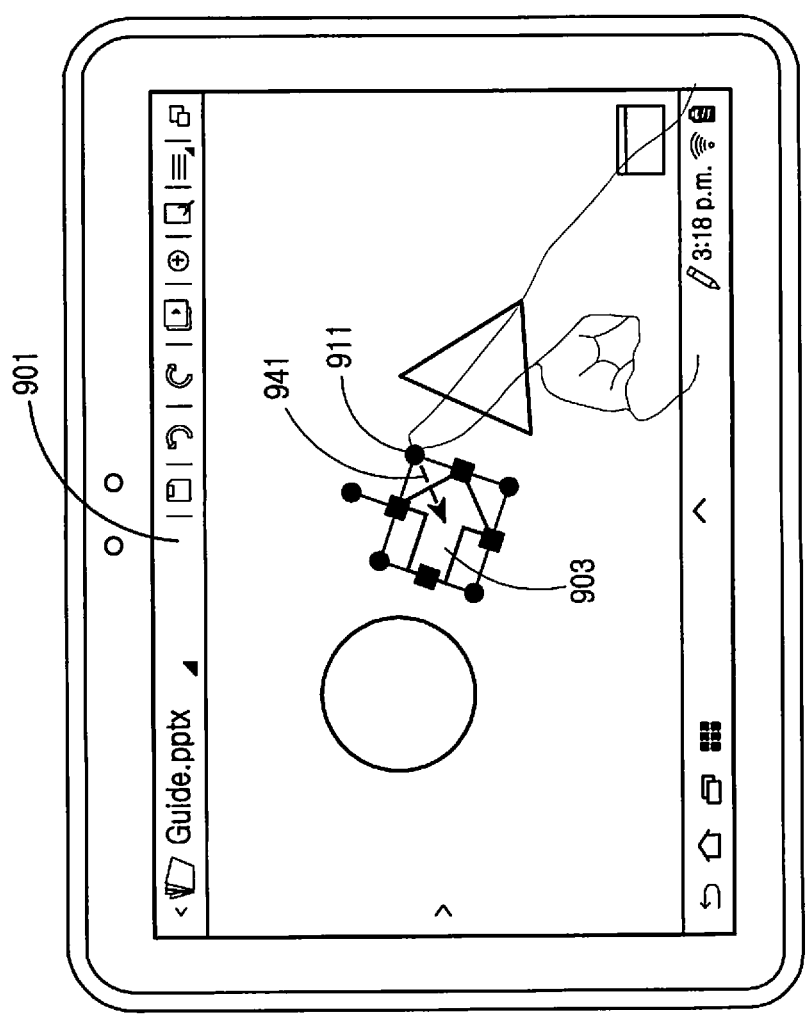

In step 303, the electronic device determines whether at least two areas for editing an object overlap. Herein, an area for editing an object is an area for detecting a selection on an object editing handle, and includes an area equal to, narrower than, or wider than a display area of the object editing handle icon. In addition, the area for editing the object may further include an area for moving the object. For example, as illustrated in FIG. 9D, if a movement of a first handle 911 is detected in a direction 941, the electronic device determines whether the area for editing the object overlaps another area for editing the object. For example, if the area for editing the object is equal to a display area of the object editing handle icon, the electronic device determines whether the object editing handle icon overlaps another object editing handle icon. If at least two areas for editing the object do not overlap, the procedure of FIG. 3 ends.

Figure 9E:
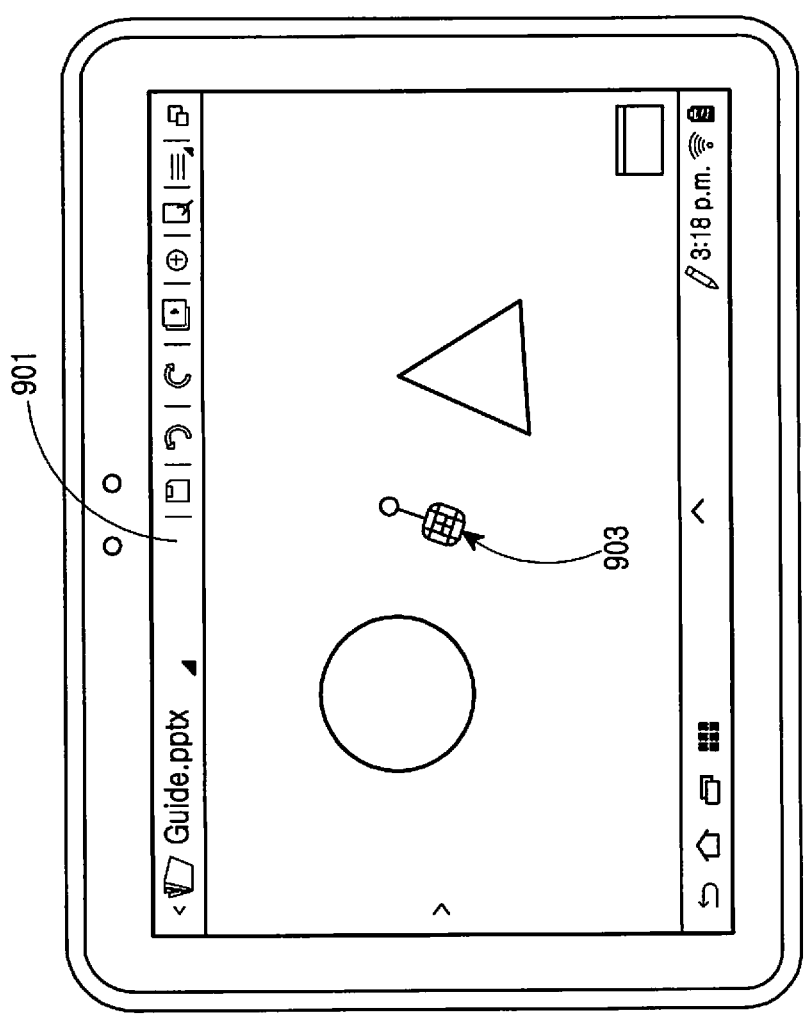
Figure 9F:
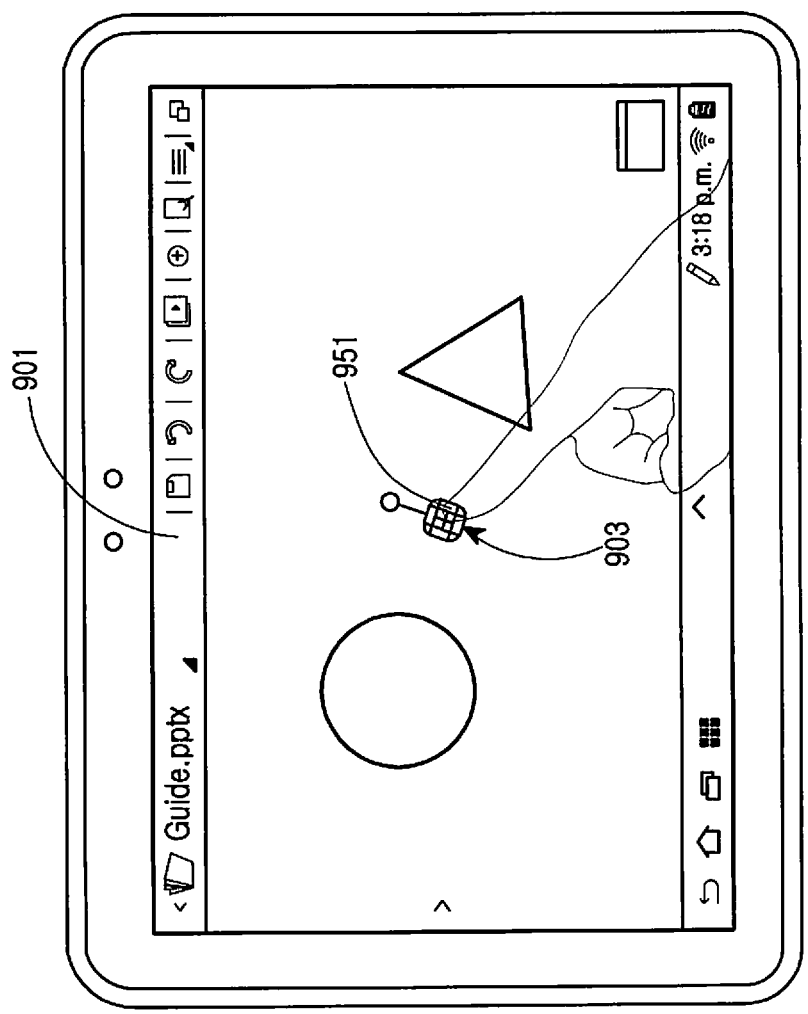
Figure 9G:
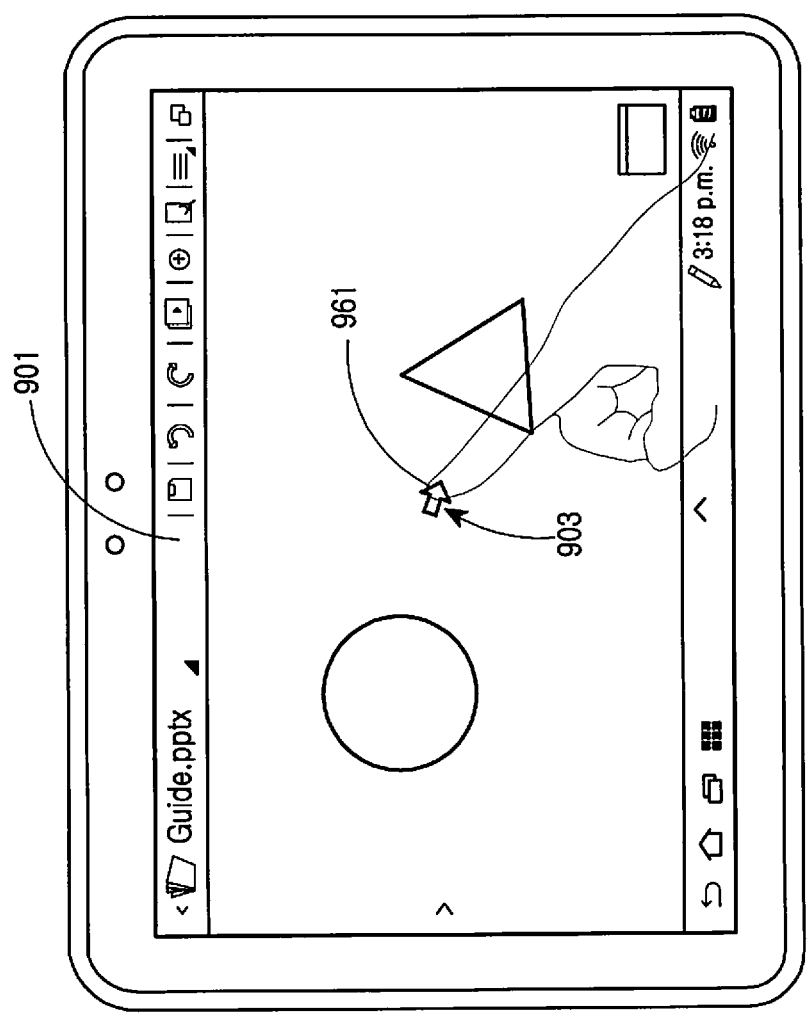
Figure 9H:
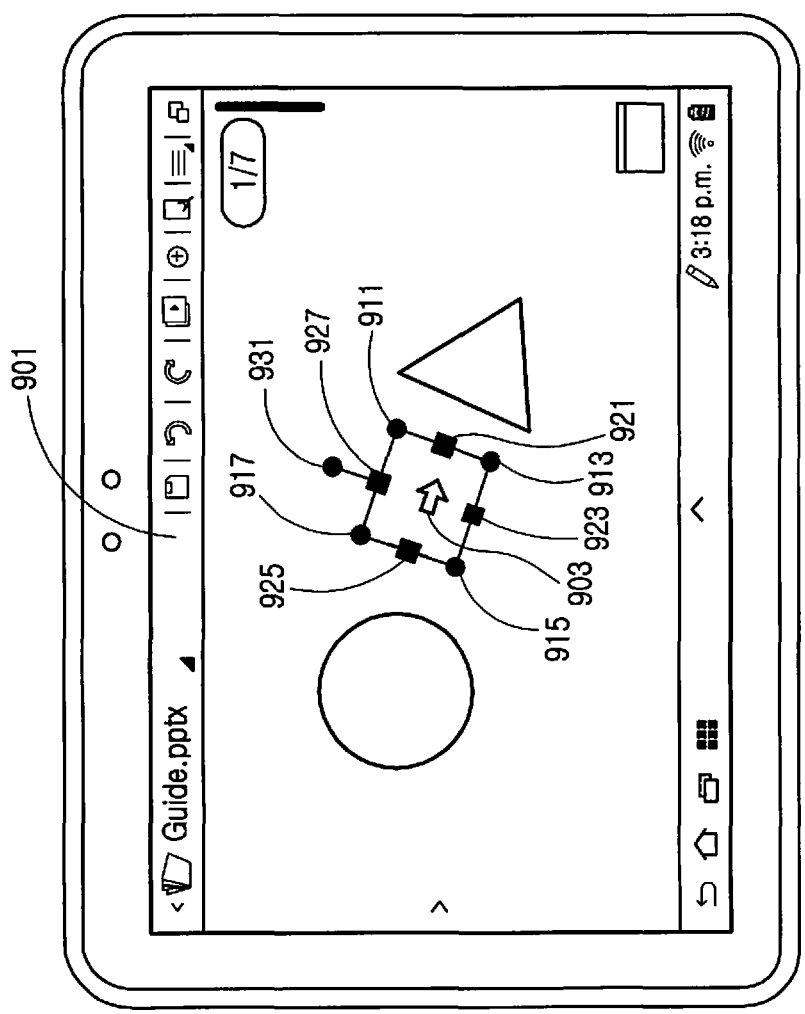

Meanwhile, if the at least two areas for editing the object overlap, the electronic device enlarges the selected area for editing the object in step 305. For example, as illustrated in FIG. 9E, if an area for editing the object 903 overlaps another area for editing the object, the electronic device enlarges the area for editing the object to facilitate the editing of the object 903, as illustrated in FIG. 9H. For example, if the area for editing the object is equal to the display area of the object editing handle icon, the electronic device displays the object editing handle icon by enlarging and moving it so as to avoid overlapping another object editing handle icon. In this case, the electronic device enlarges the object editing area based on a minimum interval in which the object editing area does not overlap.

Thereafter, the procedure of FIG. 3 ends.

In the aforementioned embodiment, the electronic device controls to avoid overlapping of areas for editing an object, when the object editing areas overlap, while editing the object.

Figure 4:
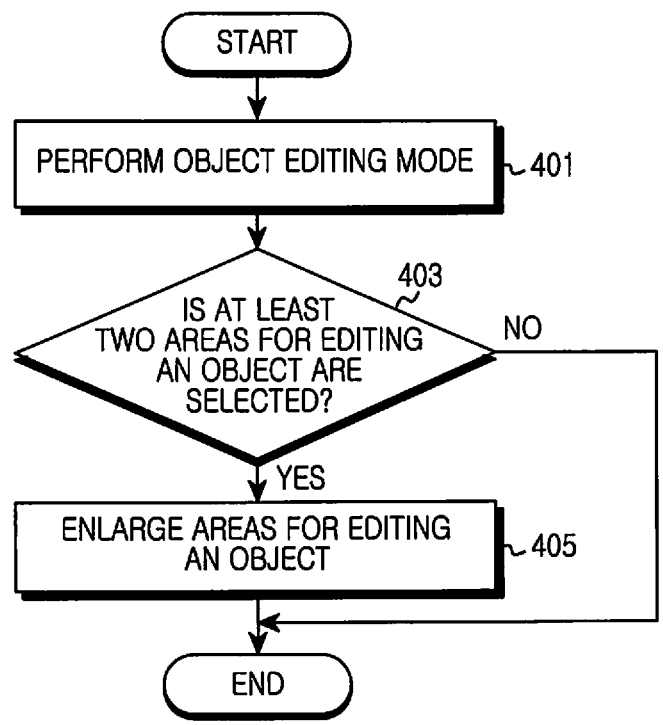
FIG. 4 is a flowchart of a control process for avoiding overlapping of object editing areas, upon detecting a selection on at least two object editing areas while an object is edited in an electronic device according to another embodiment of the present disclosure.

In another embodiment, upon detecting a selection on at least two areas for editing an object, while an object is edited as illustrated in FIG. 4, to be described below, the electronic device may control to avoid overlapping of the areas for editing the object.

FIG. 4 is a flowchart of a control process for avoiding overlapping of areas for editing an object upon detecting a selection on at least two areas for editing n object, while an object is edited in an electronic device according to another embodiment of the present disclosure.

Referring to FIG. 4, the electronic device performs an object editing mode in step 401. For example, as illustrated in FIG. 9B, upon detecting a selection 905 on an object 903 displayed by using an object editing program 901, the electronic device recognizes that the object 903 is being edited. Accordingly, the electronic device displays at least one object editing handle for editing the object 903, as illustrated in FIG. 9C. Thereafter, as illustrated in FIG. 9D, if a movement of a first handle 911 is detected in a direction 941, the electronic device displays the object 903 by changing a size thereof as illustrated in FIG. 9E.

In step 403, the electronic device determines whether a selection on the at least two areas for editing the object is detected. For example, as illustrated in FIG. 9F, upon detecting a selection 951 on the object 903 in an editing mode state, the electronic device determines whether the selection on the at least two areas for editing the object is detected. Upon detecting a selection on any one of the areas for editing the object, the procedure of FIG. 4 ends.

Otherwise, upon detecting the selection on the at least two areas for editing the object, the electronic device enlarges the area for editing the object in step 405. For example, as illustrated in FIG. 9F, upon detecting a selection 951 on at least two areas for editing an object, the electronic device enlarges the area for editing the object to facilitate the editing of the object 903, as illustrated in FIG. 9H. For example, if the area for editing the object is equal to the display area of the object editing handle icon, the electronic device displays the object editing handle icon by enlarging and moving it so as to avoid overlapping another object editing handle icon. In this case, the electronic device enlarges the area for editing the object based on a minimum interval in which the areas for editing the object do not overlap.

Thereafter, the procedure of FIG. 4 ends.

In the aforementioned embodiment, the electronic device controls to avoid overlapping of areas for editing an object upon detecting the selection of at least two areas for editing the object, while editing the object.

In another embodiment, upon detecting a selection on at least two areas for editing an object while an object is edited, the electronic device may control to avoid overlapping of the areas for editing the object.

Figure 5:
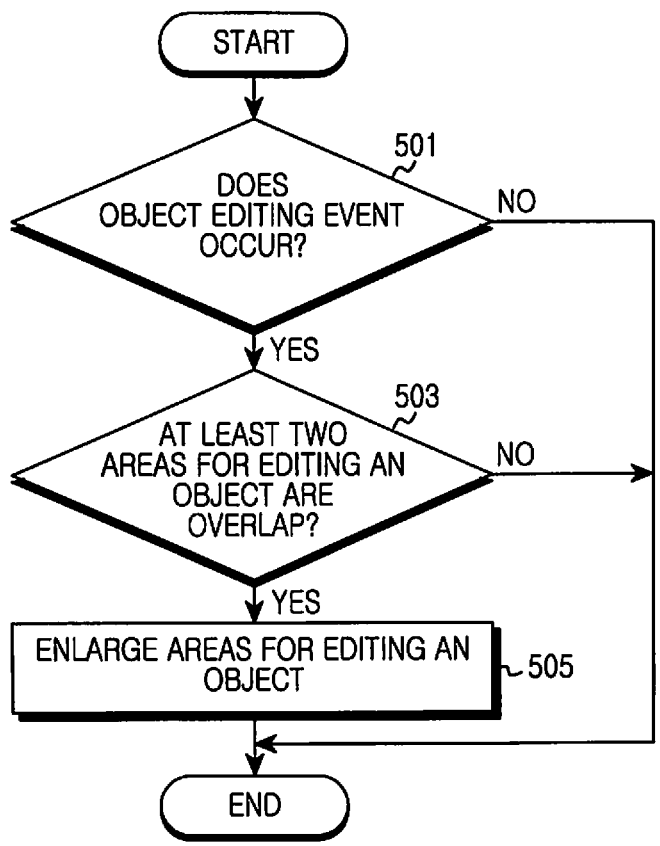
FIG. 5 is a flowchart of a control process for avoiding overlapping of object editing areas by determining whether at least two object editing areas overlap at the occurrence of an object editing event in an electronic device according to another embodiment of the present disclosure.

In another embodiment, at the occurrence of an object editing event as illustrated in FIG. 5 to be described below, the electronic device may enlarge the area for editing the object by determining whether at least two areas for editing the object overlap.

FIG. 5 is a flowchart of a control process for avoiding overlapping of areas for editing an object by determining whether at least two areas for editing the object overlap at the occurrence of an object editing event in an electronic device according to another embodiment of the present disclosure.

Referring to FIG. 5, the electronic device determines whether an object editing event occurs in step 501. For example, as illustrated in FIG. 9G, upon detecting a selection 961 on an object 903 displayed by using an object editing program 901, the electronic device recognizes that the object 903 is being edited. If the object editing event does not occur, the procedure of FIG. 5 ends.

Meanwhile, if the object editing event occurs at step 501, the electronic device determines whether at least two areas for editing the object overlap in step 503. For example, as illustrated in FIG. 9G, upon detecting a selection 961 on the object 903, the electronic device determines whether the area for editing the object overlaps another area for editing the object. For example, if the area for editing the object is equal to a display area of the object editing handle icon, the electronic device determines whether the object editing handle icon overlaps another object editing handle icon. If at least two areas for editing the object do not overlap, the procedure of FIG. 5 ends.

Meanwhile, if the at least two areas for editing the object overlap in step 503, the electronic device enlarges the area for editing the object in step 505. For example, as illustrated in FIG. 9E, if an area for editing the object 903 overlaps another area for editing the object, the electronic device enlarges the area for editing the object to facilitate the editing of the object 903, as illustrated in FIG. 9H. For example, if the area for editing the object is equal to the display area of the object editing handle icon, the electronic device displays the object editing handle icon by enlarging and moving it so as to avoid overlapping another object editing handle icon. In this case, the electronic device enlarges the area for editing the object based on a minimum interval in which the areas for editing the object do not overlap.

Thereafter, the procedure of FIG. 5 ends.

Figure 6:
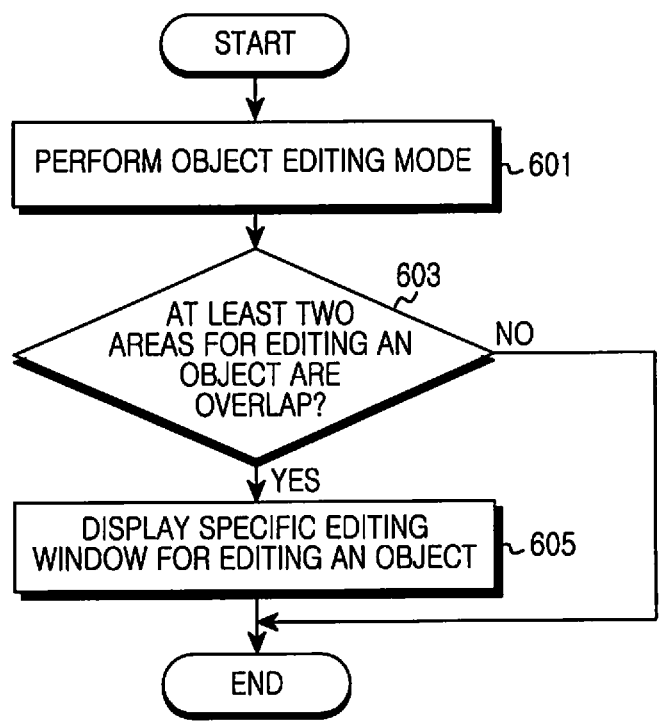
FIG. 6 is a flowchart of a process for displaying an object specific editing window for editing an object when object editing areas overlap, while editing the object in an electronic device according to another embodiment of the present disclosure.

FIG. 6 is a flowchart of a process for displaying an object specific editing window for editing an object when the area for editing the object overlaps another area for editing the object while editing the object in an electronic device according to another embodiment of the present disclosure.

Referring to FIG. 6, the electronic device performs an object editing mode in step 601. For example, as illustrated in FIG. 9B, upon detecting a selection 905 on an object 903 displayed by using an object editing program 901, the electronic device recognizes that the object 903 is being edited. Accordingly, the electronic device displays at least one object editing handle for editing the object 903 as illustrated in FIG. 9C.

In step 603, the electronic device determines whether at least two areas for editing the object overlap. For example, as illustrated in FIG. 9D, if a movement of a first handle 911 is detected in the direction 941, the electronic device determines whether the object editing areas overlap. For example, if an area for editing an object is equal to a display area of the object editing handle icon, the electronic device may determine whether the object editing handle icon overlaps another object editing handle icon. If at least two areas for editing an object do not overlap, the procedure of FIG. 6 ends.

Figure 9I:
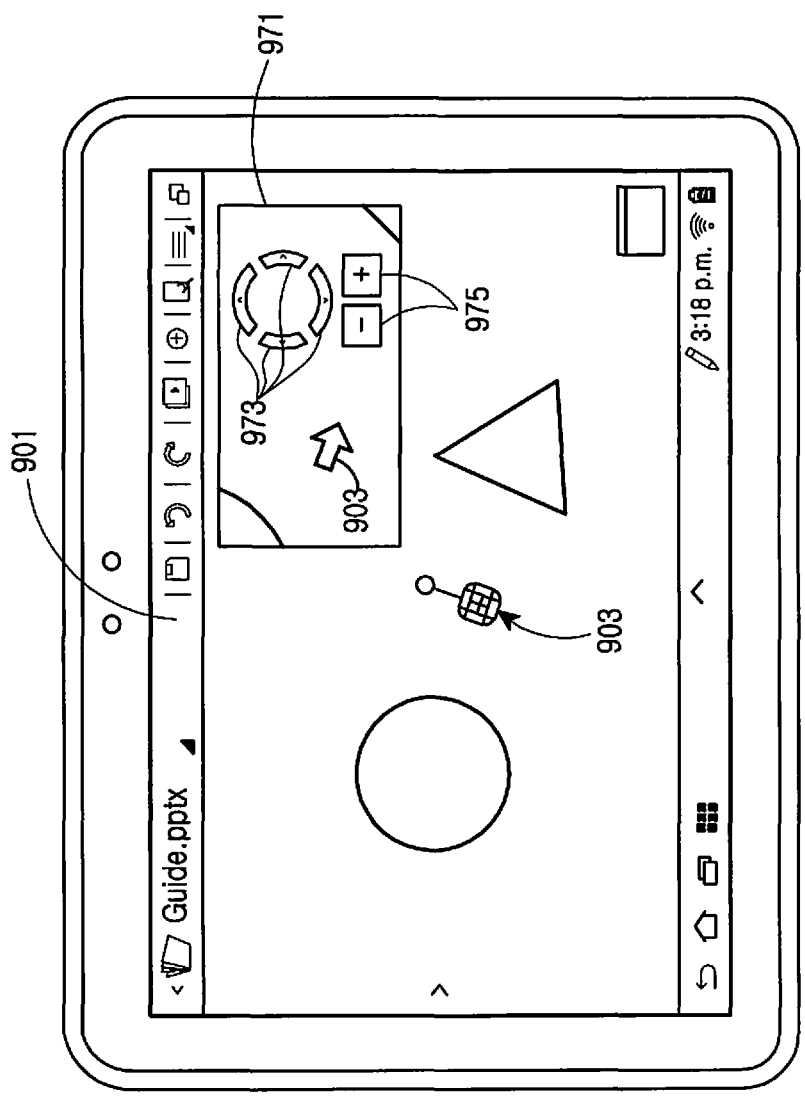

Meanwhile, if the at least two areas for editing the object overlap, the electronic device displays an object specific editing window in step 605. Herein, referring to FIG. 9I an object specific editing window 971 includes an object position editing icon 973 for changing a position of the object 903 and an object size editing icon 975 for changing a size of the object 903. In addition, an object direction editing icon for changing a direction of the object 903 may also be included. For example, as illustrated in FIG. 9E, if an area for editing the object 903 overlaps another area for editing the object, the electronic device displays the object specific editing window 971 to facilitate the editing of the object 903, as illustrated in FIG. 9I. In this case, the electronic device may display the object 903 excluding the object editing handle icon in the object specific editing window 971.

Thereafter, the procedure of FIG. 6 ends.

In the aforementioned embodiment, the electronic device displays the object specific editing window when the area for editing the object overlaps another area for editing the object, while editing the object.

Figure 7:
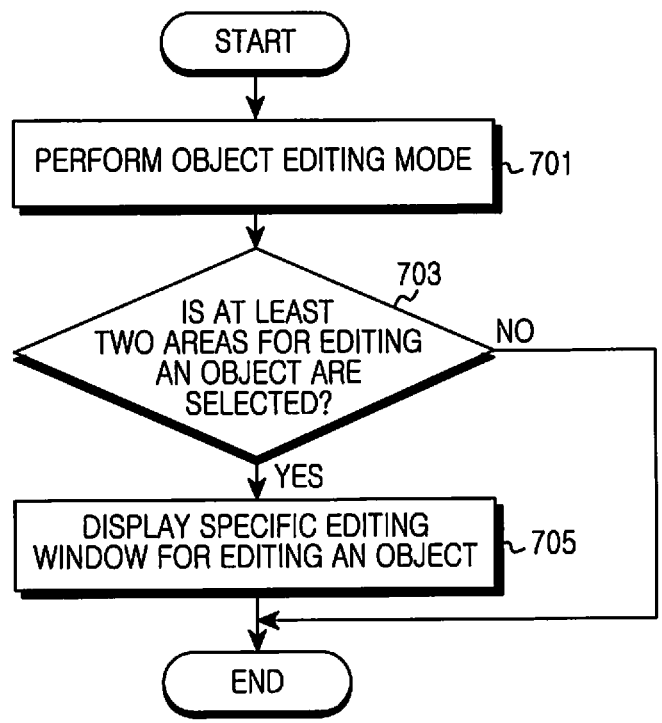
FIG. 7 is a flowchart of a process for displaying an object specific editing window for editing an object upon detecting a selection on at least two object editing areas while an object is edited in an electronic device according to another embodiment of the present disclosure.

In another embodiment, upon detecting a selection on at least two areas for editing an object, while the object is edited, as illustrated in FIG. 7, to be described below, the electronic device displays an object specific editing window.

FIG. 7 is a flowchart of a process for displaying an object specific editing window for editing an object upon detecting a selection on at least two areas for editing the object, while the object is edited in an electronic device according to another embodiment of the present disclosure.

Referring to FIG. 7, the electronic device performs an object editing mode in step 701. For example, as illustrated in FIG. 9B, upon detecting a selection 905 on an object 903 displayed by using an object editing program 901, the electronic device recognizes that the object 903 is edited. Accordingly, as illustrated in FIG. 9C, the electronic device displays at least one object editing handle for editing the object 903. Thereafter, if a movement of a first handle 911 is detected in the direction 941, as illustrated in FIG. 9D, the electronic device displays the object 903 by changing a size thereof as illustrated in FIG. 9E.

In step 703, the electronic device determines whether a selection on the at least two areas for editing the object is detected. For example, upon detecting a selection 951 on the object 903 in an editing mode state as illustrated in FIG. 9F, the electronic device determines whether the selection on the at least two areas for editing the object is detected. Upon detecting a selection on any one of the areas for editing the object, the procedure of FIG. 7 ends.

Otherwise, upon detecting the selection on the at least two areas for editing the object, the electronic device displays the object specific editing window in step 705. For example, as illustrated in FIG. 9F, upon detecting a selection 951 on at least two areas for editing the object, the electronic device displays the object specific editing window 971 to facilitate the editing of the object 903 as illustrated in FIG. 9I. In this case, the electronic device displays the object 903 excluding the object editing handle icon in the object specific editing window 971.

Thereafter, the procedure of FIG. 7 ends.

In the aforementioned embodiment, the electronic device displays the object specific editing window upon detecting the selection on the at least two areas for editing the object, while editing the object.

In another embodiment, upon detecting a selection on at least two areas for editing an object, while the object is edited, the electronic device displays the object specific editing window.

Figure 8:
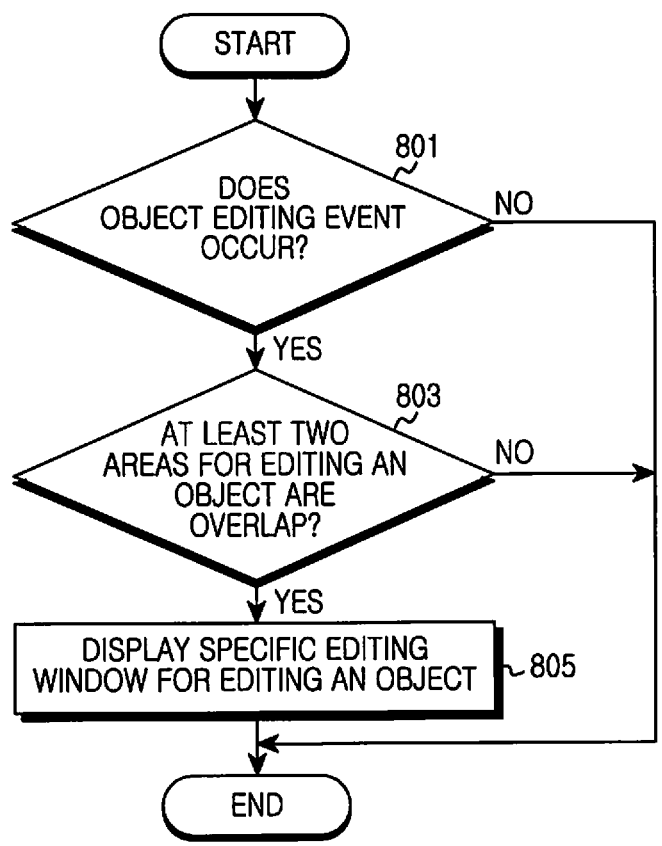
FIG. 8 is a flowchart of a process for displaying an object specific editing window for editing an object at the occurrence of an object editing event in an electronic device according to another embodiment of the present disclosure.

In another embodiment, at the occurrence of an object editing event, as illustrated in FIG. 8, to be described below, the electronic device displays the object specific editing window by determining whether at least two areas for editing the object overlap.

FIG. 8 is a flowchart of a process for displaying an object specific editing window for editing an object at the occurrence of an object editing event in an electronic device according to another embodiment of the present disclosure.

Referring to FIG. 8, the electronic device determines whether an object editing event occurs in step 801. For example, as illustrated in FIG. 9G, upon detecting a selection 961 on an object 903 displayed by using an object editing program 901, the electronic device recognizes that the object 903 is being edited. If the object editing event does not occur, the procedure of FIG. 8 ends.

Meanwhile, if the object editing event occurs, the electronic device determines whether at least two areas for editing the object overlap in step 803. For example, as illustrated in FIG. 9G, upon detecting the selection 961 on the object 903, the electronic device determines whether the area for editing the object overlaps another area for editing the object. For example, if the area for editing the object is equal to a display area of the object editing handle icon, the electronic device determines whether the object editing handle icon overlaps another object editing handle icon. If at least two areas for editing the object do not overlap, the procedure of FIG. 8 ends.

Meanwhile, if the at least two areas for editing the object overlap, the electronic device displays an object specific editing window in step 805. For example, as illustrated in FIG. 9E, if an area for editing the object 903 overlaps, the electronic device may display an object specific editing window 971 to facilitate the editing of the object 903 as illustrated in FIG. 9I. In this case, the electronic device displays the object 903 excluding the object editing handle icon in the object specific editing window 971.

Thereafter, the procedure of FIG. 9 ends.

In the aforementioned embodiments, the electronic device enlarges the area for editing the object or displays the object specific editing window to facilitate the editing of the object.

Figure 9J:
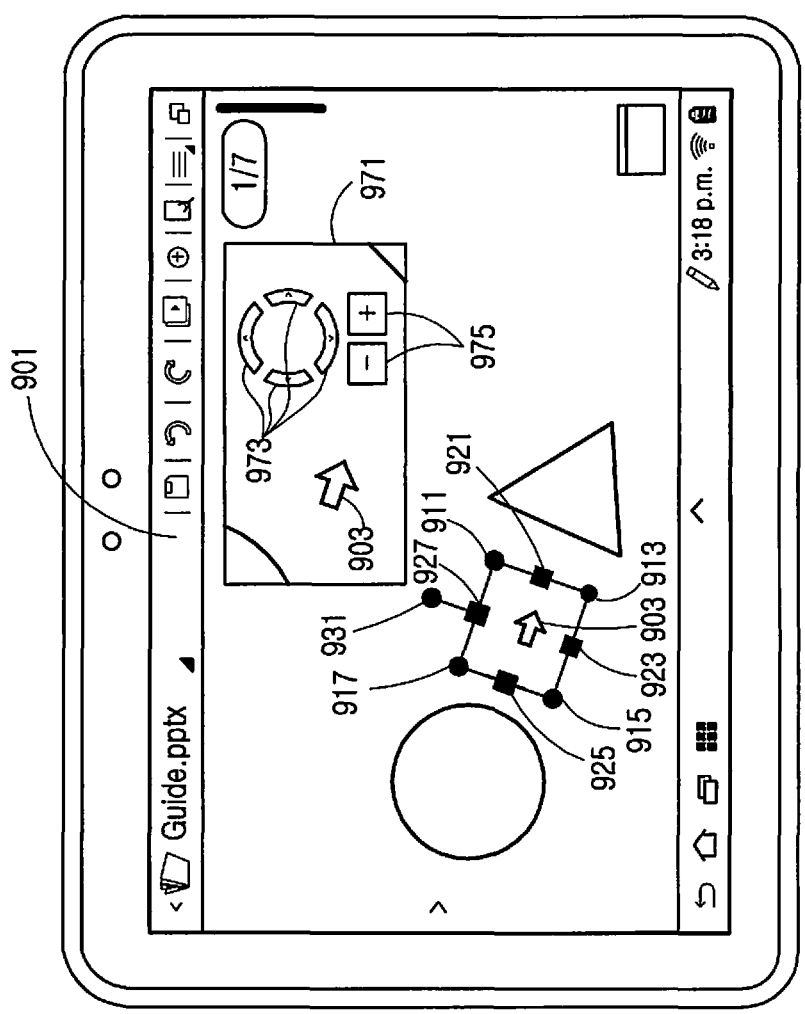

In another embodiment, as illustrated in FIG. 9J, the electronic device simultaneously performs an operation of enlarging the area for editing the object and an operation of displaying the object specific editing window to facilitate the editing of the object.

In the aforementioned embodiments, the electronic device enlarges the area for editing the object or displays the object specific editing window upon detecting overlapping of the object editing area.

In another embodiment, if a size of an object is less than or equal to a reference size, the electronic device may enlarge the area for editing the object or may display the object specific editing window.

As described above, if an area for editing an object overlaps another area for editing the object, an electronic device enlarges the area for editing the object, and thus the user of the electronic device advantageously can edit the object irrespective of a size of the object.

In addition, if the area for editing the object overlaps another area for editing the object, the electronic device displays an object specific editing window for editing the object, and thus the user of the electronic device advantageously can edit the object irrespective of the size of the object by using the object specific editing window.

It will be appreciated that embodiments of the present disclosure according to the claims and description in the specification can be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present disclosure. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been particularly shown and described with reference to certain embodiments thereof, it will be understood by those skilled in the art that various changes in form and details may be made therein without departing from the spirit and scope of the present disclosure as defined by the appended claims.

What is claimed is:

1. A method in an electronic device, the method comprising:
   displaying an object and at least two areas for editing the object, wherein the at least two areas comprise a first area for changing a shape of the object and a second area for moving the object;
   identifying a size of the object; and
   if the size of the object is less than a reference size, enlarging the first area for changing the shape of the object and the second area for moving the object while maintaining the size of the object.

2. The method of claim 1, wherein the first area for changing the shape of the object includes an area equal to, narrower than, or wider than a display area of an object editing handle, and is used for detecting a selection on the object editing handle for editing the object.

3. The method of claim 2, wherein the object editing handle includes a handle for changing a size of the object and a handle for rotating the object.

4. The method of claim 2, wherein enlarging the first area for changing the shape of the object comprises displaying the first area for changing the shape of the object by enlarging and moving a size of the object editing handle.

5. The method of claim 2, wherein identifying the size of the object comprises determining whether the first area for changing the shape of the object overlaps the second area for moving the object, upon detecting the selection on the object.

6. The method of claim 1, wherein identifying the size of the object comprises determining whether the first area for changing the shape of the object overlaps the second area for moving the object at an occurrence of an editing event for the object.

7. The method of claim 1, wherein identifying the size of the object comprises determining whether the first area for changing the shape of the object overlaps the second area for moving the object, upon detecting a movement of the first area for changing the shape of the object.

8. The method of claim 1, wherein enlarging the first area for changing the shape of the object comprises enlarging the first area for changing the shape of the object based on a reference interval in which the area for changing the shape of the object does not overlap the second area for moving the object.

9. The method of claim 1, further comprising displaying an object specific editing window for editing the object if the size of the object is less than a reference size.

10. The method of claim 9, wherein the object specific editing window comprises at least one of an object position editing icon for changing a position of the object, an object size editing icon for changing a size of the object, and an object direction editing icon for changing a direction of the object.

11. An electronic device comprising:
    a display; and
    at least one processor operatively coupled to the display, and configured to:
       control the display to display an object and at least two areas for editing the object, wherein the at least two areas comprise a first area for changing a shape of the object and a second area for moving the object;
       identify a size of the object; and
       if the size of the object is less than a reference size, enlarge the first area for changing the shape of the object and the second area for moving the object while maintaining the size of the object.

12. The electronic device of claim 11, wherein the first area for changing the shape of comprises an area equal to, narrower than, or wider than a display area of an object editing handle, and is used as an area for detecting a selection on the object editing handle for editing the object.

13. The electronic device of claim 12, wherein the object editing handle includes a handle for changing a size of the object and a handle for rotating the object.

14. The electronic device of claim 12, wherein if the first area for changing the shape of the object is enlarged, the processor displays the first area for changing the shape of the object by enlarging and moving a size of the object editing handle.

15. The electronic device of claim 12, wherein the processor determines whether the first area for changing the shape of the object overlaps the second area for moving the object, upon detecting the selection on the area for editing the object.

16. The electronic device of claim 11, wherein the processor determines whether the first area for changing the shape of the object overlaps the second area for moving the object at an occurrence of an editing event for the object.

17. The electronic device of claim 11, wherein the processor determines whether the first area for changing the shape of the object overlaps the second area for moving the object, upon detecting a movement of the first area for changing the shape of the object.

18. The electronic device of claim 11, wherein the processor enlarges the first area for changing the shape of the object based on a reference interval in which the first area for changing the shape of the object does not overlap the second area for moving the object.

19. The electronic device of claim 11, wherein the processor displays an object specific editing window for editing the object if the size of the object is less than a reference size.

20. The electronic device of claim 19, wherein the object specific editing window comprises at least one of an object position editing icon for changing a position of the object, an object size editing icon for changing a size of the object, and an object direction editing icon for changing a direction of the object.

* * * * *